United States Patent
Naaman et al.

(10) Patent No.: US 8,086,048 B2
(45) Date of Patent: Dec. 27, 2011

(54) SYSTEM TO COMPILE LANDMARK IMAGE SEARCH RESULTS

(75) Inventors: Mor Naaman, New York, NY (US); Lyndon Kennedy, Brooklyn, NY (US)

(73) Assignee: Yahoo! Inc., Sunnyvale, CA (US)

( * ) Notice: Subject to any disclaimer, the term of this patent is extended or adjusted under 35 U.S.C. 154(b) by 862 days.

(21) Appl. No.: 12/126,387

(22) Filed: May 23, 2008

(65) Prior Publication Data

US 2009/0290812 A1    Nov. 26, 2009

(51) Int. Cl.
*G06K 9/62* (2006.01)
(52) U.S. Cl. ......... 382/225; 382/155; 382/181; 382/305
(58) Field of Classification Search .................. 382/155, 382/181, 224–228, 305, 306
See application file for complete search history.

(56) References Cited

U.S. PATENT DOCUMENTS 6,072,904 A * 6/2000 Desai et al. .................. 382/225
2005/0162523 A1 * 7/2005 Darrell et al. ............. 348/211.2

OTHER PUBLICATIONS

Kennedy et al., "How Flickr Helps us Make Sense of the World: Context and Content in Community-Contributed Media Collections," Proceedings of the 15th ACM International Conference on Multimedia, Sep. 23-28, 2007.*
Jaffe et al., "Generating Summaries and Visualization for Large Collections of Geo-Referenced Photographs," Proceedings of the 8th ACM International Workshop on Multimedia Information Retrieval, Oct. 26-27, 2006.*

* cited by examiner

*Primary Examiner* — Wesley Tucker
(74) *Attorney, Agent, or Firm* — Stattler-Suh PC

(57) ABSTRACT

This patent discloses a system to compile a landmark image search result. The system may determine a rank of each image within a visual cluster according to at least one of a low-level self-similarity score, a low-level discriminative modeling score, and a point wise linking score. The landmark image search result may be compiled as a function of the rank of each image.

24 Claims, 7 Drawing Sheets

SYSTEM TO COMPILE LANDMARK IMAGE SEARCH RESULTS

BACKGROUND

1. Field

The information disclosed in this patent relates to retrieval of stored images such as those available in collections over the Internet.

2. Background Information

Image search on the Internet typically involves a search engine specialized on finding pictures, images, animations, and other similar media. A user may enter keywords and search phrases into an image search engine to receive back a set of thumbnail images as search results that may be sorted by relevancy. Specialized search engines, such as those for image search, are among the fastest growing search services on the internet. In 2005 alone, the number of image searches increased by 91% according to a March 2006 Nielsen NetRatings. A reason for this is that community collections of web-based media are becoming commonplace and represent a growing, significant portion of the available Internet content.

Images containing landmarks include places that might be of interest to tourists and others due to notable physical features or historical significance. Whether manmade or naturally occurring, landmark images are important for education or travel-related search and exploration tasks and receive a significant contribution volume in the major photo sharing websites. For example, over 50,000 images on Flickr were tagged in 2007 with the text string Golden Gate Bridge, with over 28,000,000 public geotagged images on Flickr.

There are problems with obtaining representative and diverse views of the world landmarks from community-contributed collections on the web. For example, text annotations to the images provided by users often are inaccurate. The images themselves are of varying quality and the sheer volume of landmark images in any one collection makes image content hard to browse and represent, particularly since more photos are added everyday to a given database. What is needed is system to overcome these and other problems.

SUMMARY

This patent discloses a system to compile a landmark image search result. The system may determine a rank of each image within a visual cluster according to at least one of a low-level self-similarity score, a low-level discriminative modeling score, and a point wise linking score. The landmark image search result may be compiled as a function of the rank of each image.

DETAILED DESCRIPTION

Figure 1:
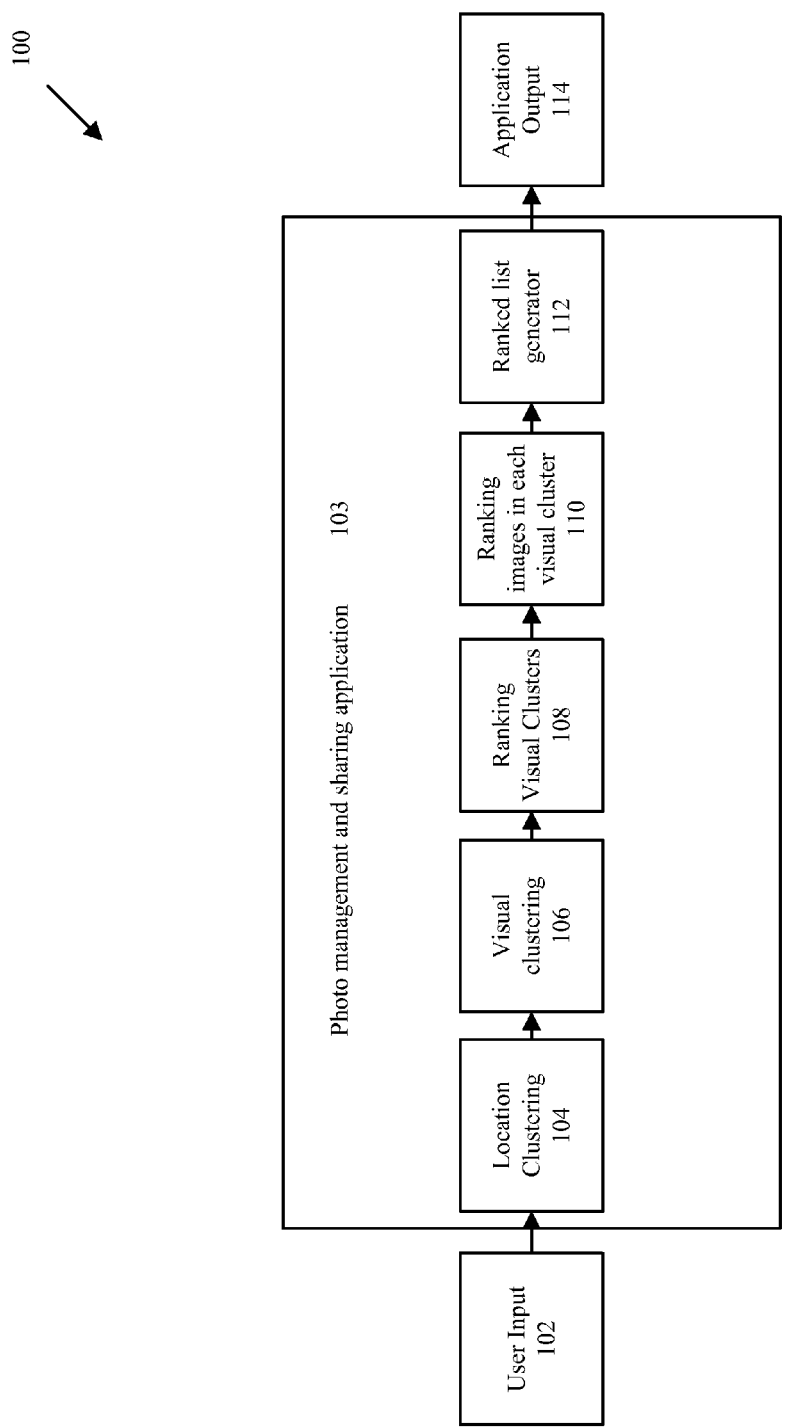
FIG. 1 is a block diagram illustrating a generalized landmark image search system 100.

FIG. 1 is a block diagram illustrating a generalized landmark image search system 100. System 100 works towards extracting representative sets of images that may best characterize a specific location, attraction, or other landmark within a given geographical area. By ranking image collection photos, reliable visual summaries of a landmark may be displayed to a requestor. The returned image summary may include diverse views of the landmark as well as images that may be representative of that landmark. For example, searching a dataset of 110,000 images of the San Francisco geographical area with system 100 for photos of the Golden Gate Bridge may return a variety of images taken at different angles to the bridge, with those ranked as the most representative of that landmark being presented to the user.

Preferably, system 100 may be applied over the Internet to a community-contributed image collection modifiable by anyone over the Internet. System 100 may utilize a combination of content- and context-based tools to generate representative sets of images for location-driven landmarks. In exercising this typical search task, system 100 may be implemented through unsupervised learning in that system 100 need not require a set of human prepared examples or the training of human classifiers for every world landmark. Since system 100 may be utilized without a need for a human landmark gazetteer tagging the images with a textual description, system 100 may be inexpensive to implement, even as image collections grow, and may be utilized well beyond these early years of content-based image retrieval.

As shown in FIG. 1, user input 102 may be captured by a photo management and sharing application 103. Photo management and sharing application 103 may be an online photo management and sharing application such as Flickr that may house a set of photos $P_G$, where those photos may be accessible by anyone through a search over the Internet. User input 102 may be a search string such as "Golden Gate Bridge" that may be based on a desire to retrieve photos from the photo management and sharing application 103 that may be representative of the Golden Gate Bridge located in San Francisco, Calif. Photo management and sharing application 103 may include devices that may process user input 102 and send out landmark image search results from the set of photos $P_G$ through application output 114.

At location clustering 104, system 100 may compile information about each photo in a collection of photos from tag and other metadata. For example, to improve a likelihood of finding actual positive (representative) images through system 100, each tag may be placed into a location cluster and ranked based on adjusted tag frequency. After utilizing tag and other metadata to automatically detect photographs that likely contain a desired landmark, system 100 may proceed to visual clustering 106 to apply image analysis techniques. Utilizing the tag and other metadata before applying image analysis techniques may prove more scalable and robust. Location clustering 104 is addressed further in connection with method 200 below.

At visual clustering 106, system 100 may compile information about the visual features of each photo in the photo collection from the image itself. These visual features may be utilized to group the images into visual clusters. Each visual cluster generally may focus on a different view of the landmark, such as photos taken at a particular angle, photos taken of a particular portion of the landmark, photos taken from outside the landmark, and photos taken from inside the landmark. Visual clustering 106 is addressed further in connection with method 300 below.

At ranking visual clusters 108, system 100 may rank the visual clusters of visual clustering 106. This visual cluster ranking may be according to how well each visual cluster represents the various views associated with the landmark. For example, in a search for 'Golden Gate Bridge,' photos of one of the two towers of the Golden Gate Bridge may be more representative of the Golden Gate Bridge than close-up photos of the cables supporting the bridge. Those visual clusters that may be the most representative views of the landmark may be more likely to contain the most representative images of the landmark. Ranking visual clusters 108 is addressed further in connection with method 400 below.

At ranking images in each visual cluster 110, system 100 may rank the images within each visual clusters of ranking visual clusters 108 to obtain and return to the user images that may best characterize a specific location, attraction, or other landmark within a given geographical area. Several different types of visual processing may be applied over the set of images to mine recurrent patterns associated with a cluster. For example, in comparing two photos within the same high-ranking visual cluster, a photo of an entire tower of the Golden Gate Bridge may be more representative of the Golden Gate Bridge than a close-up photo of a portion of that same tower. In deciding between the two photos to return to the user, ranking images in each visual cluster 110 may be more likely to return the photo of an entire tower of the Golden Gate Bridge. Ranking images in each visual cluster 110 is addressed further in connection with method 500 below.

At ranked list generator 112, system 100 may generate the final ranked list of representative photos $R_x$. This may be achieved through proportional sampling. Rank list generator 112 is addressed further in connection with method 600 below. The final ranked list of representative photos $R_x$ may be distributed from photo management and sharing application 103 as application output 114.

In the context of a camera, where the data is the photographic image, metadata are data about the photographic image. This metadata may be attached to a photographic image by the camera used to take the photo or by the database hosting the photo. In addition, when a user uploads an image to a photo-sharing website such as Flickr, the user may tag the picture with one or more descriptive metadata phrases.

In an experiment, system 100 was evaluated in the context of a search for images of the Golden Gate Bridge in San Francisco, Calif. using a real-life community-contributed dataset of 110,000 images from the San Francisco area. This collection of data having the San Francisco area as a common theme was divided into three major elements—photos, tags, and users—where p=photos,
x=tags,
u=users,
P≡{p}, denotes the metadata set of all photos p in the dataset (here, 110,000 images),
$X \equiv \cup_{p \in P} X_p$, denotes the metadata set of all tags x in the dataset, and
$U \equiv \{u_p\}$, denotes the metadata set of all users u who contributed to the dataset.

For the 'delta equal to' mathematical symbol ≡, equality may not be true generally, but rather equality may true under certain assumptions that may be taken in context.

As noted, the metadata set of all photos p in the dataset may be represented by P as the first major element of the three major elements photos, tags, and users. While the tag set X and user set U essentially may be characterized by one metadata element each, the photos set P may be characterized by a collection of four metadata subelements in the tuple p=($\theta_p$; $l_p$; $t_p$; $u_p$), where:

$\theta_p$=photo identifier,
$l_p$=photo capture location,
$t_p$=photo capture time, and
$u_p$=photo uploader identifier.

In other words, metadata ($\theta_p$; $l_p$; $t_p$; $u_p$) attached to the photographic image by the camera or system hosting the image may describe the resource image itself by containing a unique photo identification (e.g., $\theta_p$=12448327_0dccf33be9_m.jpg), the photo's latitude and longitude capture location (e.g., $l_p$=37.8197°, −122.4786°), the photo's capture time (e.g., $t_p$=Feb. 16, 2006, 8:30:37 AM PST), and a unique identification of the user that contributed the photo to the dataset (e.g., $u_p$=Fred_ejouie13).

The unique photo identification $\theta_p$ may be provided by a photo-sharing website hosting the image. The photo capture location $l_p$ typically may refer to the location where the photo p was taken (the latitude and longitude location of the camera when the photo was taken), but sometimes may refer to the location of the photographed object. The photo capture time $t_p$ typically may mark the moment the photo was taken, but sometimes may mark the time the photo was uploaded into the dataset of the photo-sharing website. Digital cameras typically stamp each photo with a photo capture location $l_p$ and a photo capture time $t_p$. A user may provide a photo uploader identifier $u_p$ on uploading photos from a camera into a photo-sharing website.

The second major element identified in the dataset is the set of tags X associated with each photo p. A tag may be a keyword or term associated with or assigned to a piece of information (a picture, a geographic map, a blog entry, a video clip, etc.) that may describe the item and enable keyword-based classification and search of information. In a search for photographs, a tag may include a user-entered unstructured text label associated with a given photo.

Metadata attached to the photographic image by the image uploader may describe the content of the resource (e.g., x="Golden Gate Bridge," x="Sunset on the Golden Gate Bridge," x="Golden Gate Bridge 50th Anniversary," x="Golden Gate Bridge at Dusk, Dedicated to My Good Friend Randy Stevens"). Since the variable x may be used to denote a tag and each photo p may have multiple tags associated with it, $X_p$ may denote this set of tags so that the set of all tags over all photos may be defined as $X \equiv \cup_{p \in P} X_p$. With S=subset,
$P_S \subseteq P$,
$X_S$≡denotes the set of tags that appear in any subset $P_S \subseteq P$ of the photo set, and
$P_x \equiv \{p \in P | p \in X_p\}$, denotes the subset of photos associated with a specific tag.

Accordingly, photos with the tag x in a subset $P_S$ of P may be denoted:

$P_{S,x} \equiv \{p \in P | Ps \cap Px\}$.

The third of the three major element identified in the dataset is the set of users U. As noted, the photo uploader identifier up may be a user provided identifier. Such user provided information might be associated with a particular photo p by the photo-sharing website. Here, $U_S \equiv \{u_p | p \in P_S\}$, denotes users that exist in the set of photos $P_S$
$U_x \equiv \{u_p | p \in P_x\}$, denotes users that have used the tag x.

There is no guarantee for the correctness of the metadata of any image. For example, a single person may use multiple photo uploader identifiers $u_p$. The tag x typically may not be a ground-truth label: false positive noise (photos tagged with the landmark name but do not visually contain the landmark) and false negative errors (photos of the landmark that are not tagged with the landmark name) are commonplace in photo sharing website datasets. In addition, the sheer volume of content associated with each tag x presents some challenges to browsing and to visualizing all the relevant content. In overcoming these challenges, system 100 may return a ranking $R_x \subseteq P_x$ of the photos given a landmark tag x such that a subset of the images in the top of this ranking may be a precise, representative, and diverse representation of the tag x. Using the present example, given a set of photos $P_{Golden\ Gate\ Bridge}$ of the single landmark represented by the tag x="Golden Gate Bridge", system 100 may compute a summary $R_{Golden\ Gate\ Bridge} \subseteq P_{Golden\ Gate\ Bridge}$ such that most of the interesting visual content in $P_{Golden\ Gate\ Bridge}$ maybe returned to the user as $R_{Golden\ Gate\ Bridge}$ for any number of photos in $R_{Golden\ Gate\ Bridge}$.

Metadata tags x may be landmark tags, event/time specific tags, party tags (e.g., neither landmark nor event), or a combination thereof. Preferably, a tag x utilized by system 100 predominately may be a landmark tag. In general, landmark tags may include the name of the landmark, be geographically specific, and represent highly local elements (i.e., have smaller scope than a city). Examples of photo tags x that may be landmark tags include "Golden Gate Bridge," "Taj Mahal," "Logan Airport," and "Notre Dame." A photo tag reading "San Francisco" or "Chicago" may be geographically specific but may not be highly localized in that neither name may represent a local element. The tag "San Francisco Marathon" may represent an event that occurs at a specific time and the tags "John Smith and friends," "dog," and "blue" may represent a party or other item in that they do not name any specific location or specific event.

In a search for Golden Gate Bridge photos, photos tag "San Francisco Marathon" or tag "John Smith and friends" initially may be given a low rank due to their tag x. This may be true even if the photo contains an image of the San Francisco Marathon as it passes over the Golden Gate Bridge or an image John Smith and friends standing on the Golden Gate Bridge. A reason for this is that experiments have shown that characterizing tags as landmark tags, event tags, and neither landmark nor event tags works well in extracting location driven images from a dataset.

Location Clustering (104)

Figure 2:
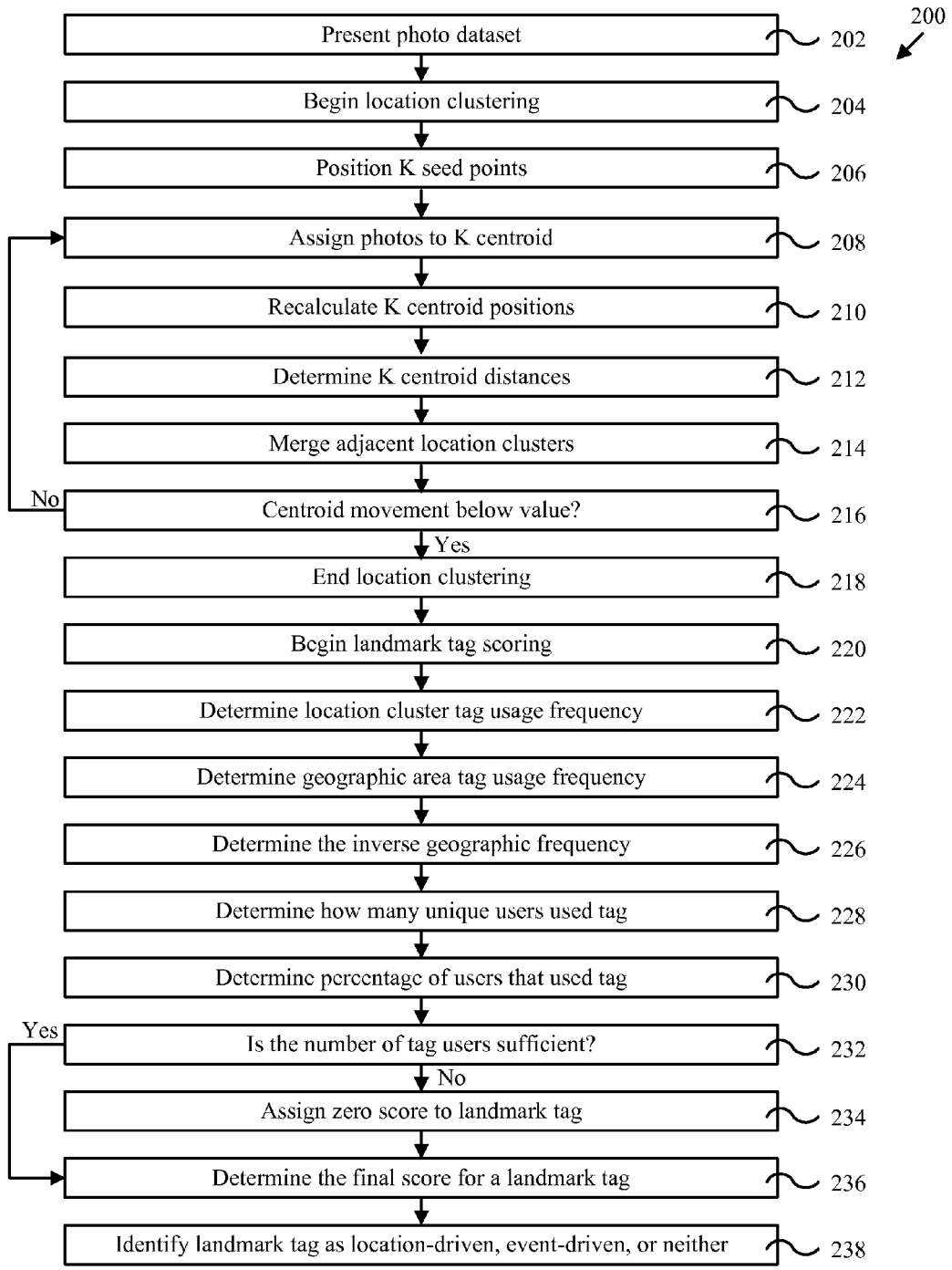
FIG. 2 is a flow chart illustrating a method 200 to compile a list of the most representative landmark tags from a dataset of photos taken in a predefined geographic area G.

FIG. 2 is a flow chart illustrating a method 200 to compile a list of the most representative landmark tags from a dataset of photos taken in a predefined geographic area G. In general, the photos may be geographically grouped (clustered) through their tags as part of and around a geographic location point. The landmark tags of the photos may be scored to identify landmark tags that may be frequent in some location clusters and infrequent elsewhere. Finally, each tag may be evaluated to determine whether it predominately may be location-driven, event-driven, or neither. Method 200 may improve a likelihood of system 100 finding actual positive (representative) images from the photo dataset by mapping from a given geographic area G to a set of location clusters $C_x$ in which a landmark tag x may be relevant.

At 202, method 200 may present a dataset composed of a set of photos taken in geographic areas G, where the set of photos may be identified by $P_G$. The set of photos $P_G$ may be housed by an online photo management and sharing application such as Flickr and accessible by anyone through a search over the Internet. At 204, method 200 may begin geographically clustering the set of photos $P_G$ around one or more latitude and longitude points.

Clustering includes the classification of objects into different groups, or more precisely, the partitioning of a data set into subsets (clusters). Ideally, the data in each subset may share some common trait, such as proximity according to some defined distance measure. The k-means algorithm is an algorithm to cluster n objects based on attributes into k partitions. In the present example, method 200 may divide and group each of the 110,000 photos (n=110,000) into k partitions based on each photo's latitude and longitude capture location $l_p$.

Method 200 may utilize aspects of the K-means clustering algorithm. However, method 200 may utilize aspects from a different clustering algorithm that does not require an a-priori decision about the number of clusters in the area or may deploy other criteria, such as those from the Hungarian Clustering method or the Bayesian information criterion (BIC) to aid in a search for the value of K.

At 206, method 200 may utilized a predetermined number of seed points K to place K points into the space represented by the photos. The seed points K may represent initial group centroids, each of which may be positioned at a latitude and longitude point within the geographic area G. The initial number of seed points K may be based on $|P_G|$, the number of photographs in the area under question. For example, experiments have show that the seed value K approximately may range from three for sparse areas (n=under 100 photographs) to fifteen for denser areas (n is greater than 4000 photographs), such that $$n = 325K - 875 \quad (1)$$

where K is a natural number from 3 to 15, K=3 for n<100, and K=15 for N>4,000.

At 208, method 200 may assign each photo to the group that has the closest K centroid as may be measured by the geographical distance of each photo's capture location $l_p$ to the location of each seed point K. At 210, the positions of each K centroid may be recalculated once all the photos have been assigned at 208.

At 212, method 200 may determine the distance of each K centroid to all other K centroids. If two K centroids are within a predetermined percentage of the width of the geographic area G, then method 200 may merge the two location clusters associated with those K centroids at 214. For example, if two K centroids are within 20% of the latitude width of the geographic area G, then method 200 may merge the two location clusters associated with those K centroids. This merging may address the a-priori nature of the initial seed selection for the K-means clustering algorithm.

From the K centroid recalculation at 210, method 200 may determine at 216 whether each location cluster's centroid movement drops below a predetermined value. In one example, method 200 may determine whether each location cluster's centroid movement drops below 50 meters (164 feet). The San Francisco Area may have a latitude width of about 11.6 kilometers (7.2 miles). In another example, method 200 may determine whether each location cluster's centroid movement drops below about 0.5% of the smaller of the longitudinal length and latitude width of the geographic area G. If each location cluster's centroid movement does not drop below the predetermined value, then method 200 may return to 208. If each location cluster's centroid movement does drop below the predetermined value, then method 200 may proceed to 218. At 218, method 200 may end geographically clustering the set of photos $P_G$.

At this point in method 200, the set of photos $P_G$ may be in separate location clusters C, where the tags of the photos in each location cluster C may be a cluster set of tags $X_C$. Here, the landmark tags $X_C$ for each location cluster C may receive a score so that the landmark tags $X_C$ with the highest scores may be ranked as being more representative of the landmark tags than those with lower scores. In general, the score for each landmark tag x may (i) increase proportionally to the number of times that landmark tag appears with the photos of a particular location cluster C ($X_C$) but may be offset both by (ii) the number of times that landmark tag appears within all photos in the geographic area G ($X_G$) and by (iii) the number of different photographers (the number of different photo uploader identifiers $u_p$) using the same landmark tag.

At 220, method 200 may begin scoring each landmark tag x. At 222, method 200 may count the number of times a given landmark tag x is utilized within each location cluster C to determine the tag frequency (tf) according to the equation, $$tf(C,x) \equiv |P_{C,x}| \quad (2)$$

In the present example, the given landmark tag x may be 'Golden Gate Bridge' and there may be fifteen location clusters C since the number of photos (110,000) exceeds 4,000. Thus, for each of the fifteen location clusters C, step 222 may determine the number of times 'Golden Gate Bridge' is used as a tag in each location cluster.

Experiments have shown that the more unique a tag is for a specific location cluster, the more representative the tag may be for that location cluster. However, unique tags that only appear a few times in the geographic area G may not be representative. Popular tags may be more representative and it may be desirable to adjust each score with a measure of the general importance of the landmark tag in the geographic area G. The inverse geographic frequency (igf) may be a measure of the general importance of the tag and may be weighted to lower the score of landmark tags that may be common over the geographic area G.

At 224, method 200 may count the number of times a given landmark tag x is utilized within the geographic area as $|P_G,x|$. As noted above, $|P_G|$ may be the number of photographs in the geographic area G. Thus, at 226, method 200 may determine the inverse geographic frequency (igf) according to the equation, $$igf(x) \equiv |P_G|/|P_G,x| \quad (3)$$

Step 226 may consider the overall ratio of the landmark tag x among all photos in the geographic area G under consideration. This approach may smooth the process by minimizing large changes in the score weights otherwise due to a small number of photographs in a location cluster containing the landmark tag. In addition, this approach may allow method 200 to identify local trends for individual tags, regardless of their global patterns.

Multiplying the tag frequency tf(C,x) with the inverse geographic frequency igf(x) may produce a list of scores where, the higher the score, the more distinctive the landmark tag $X_C$ may be within a location cluster. However, this tag weight may be affected by a single photographer who takes and uploads a large number of photographs using the same tag. To address this scenario, method 200 may include a user element in the final scoring that may reflect the heuristic that a landmark tag may be more valuable if a number of different photographers use the landmark tag.

At 228, method 200 may determine for each location cluster the number different photographers within a location cluster ($U_C$) that used the landmark tag x ($U_{C,x}$). At 230, method 200 may determine for each location cluster C the percentage of photographers in the location cluster C that use the tag x according to the equation:

$$uf(x) \equiv U_{C,x}/U_C \quad (4)$$

At 232, method 200 may determine whether the number different photographers within a location cluster ($U_C$) that used the landmark tag x ($U_{C,x}$) is less than a predetermined threshold. If the number different photographers within a location cluster ($U_C$) that used the landmark tag x ($U_{C,x}$) is not less than a predetermined threshold, then method 200 may proceed to 236. If the number different photographers within a location cluster ($U_C$) that used the landmark tag x ($U_{C,x}$) is less than a predetermined threshold, then a score of zero (0) may be assigned for that landmark tag x at 234. In one example, method 200 may assign a score of zero to any tags that was used by less than three photographers in a given location cluster.

At 236, method 200 may determine the final score for a landmark tag x in location cluster C according to the equation, $$Score(C;x) = tf(C;x) \cdot igf(x) \cdot uf(x) \quad (5)$$

which may be written as $$Score(C;x) \equiv (tf)(igf)(uf) \quad (6)$$

Values for score(C; x) above a predetermined threshold may represent landmark tags that may be meaningful and valuable for an aggregate representation. In addition, utilizing an absolute threshold for all computed location clusters values of score(C; x) may ensure that the selected landmark tags may be representative of the location cluster.

To improve a likelihood of selecting a set of actual positive (representative) images from a set of pseudo-positive (same-tag or same-location) images, method 200 further may identify at 238 each landmark tag as location-driven, event-driven, or neither. In general, location-driven tags may exhibit significant spatial patterns and event-driven tags may exhibit significant temporal patterns. For example, a person may expect photos of a marathon event over the Golden Gate Bridge to appear significantly more often every year around the end of July and in San Francisco; whereas dog photos should appear at almost any time and in almost any location.

A location-driven tag may be more likely to be attached to a representative image then, for example, an event-driven tag, such as 'Golden Gate Bridge marathon.' In one example, the scale-structure identification method may be utilized to perform step 238. The scale-structure identification method is incorporated by reference as set out in Naaman et al. "Towards automatic extraction of event and place semantics from Flickr tags." In Proceedings of the Thirtieth Annual International ACM SIGIR Conference on Research and Development in Information Retrieval. ACM Press, July 2007. The set of tags, their location clusters, and other information derived from method 200 may be utilized as input for method 300.

Visual Clustering (106)

Figure 3:
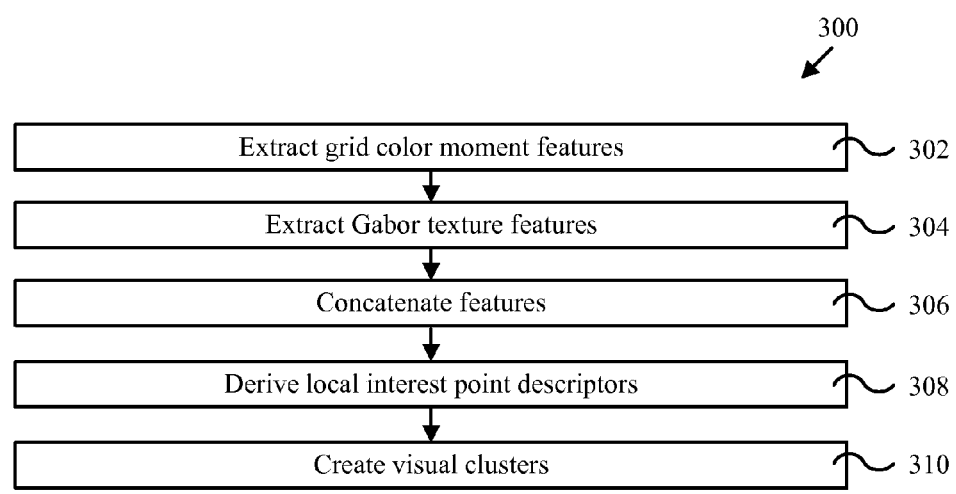
FIG. 3 is a flow chart illustrating a method 300 to compile a set of visual clusters $V_x$ for each landmark x.

FIG. 3 is a flow chart illustrating a method 300 to compile a set of visual clusters $V_x$ for each landmark x. Tourists visit many specific destinations and the photographs that they take of these destinations largely and intuitively may be dictated by a few available photo-worthy viewpoints. For example, photo-worthy viewpoints for the San Francisco Bridge may include a northeasterly shot from Baker Beach, a northerly shot from Fort Point, southern shots from the Golden Gate National Recreation Area, and a few locations on the bridge itself. Photographers may be drawn to the available photo-worthy viewpoints and the collective photographing behavior of users on photo sharing sites may provide significant insight into the most representative views of a particular landmark. Visual clustering may be a first in learning these repeated landmark views automatically from the visual photo data provided by users provide.

Visual features of an image may include global features, such as global color and texture descriptors, and local features, such as local geometric descriptors. Method 300 may cluster around global color and texture descriptors because they may provide the gist of a photo. Local interest point descriptors typically have high dimensionality and may be more valuable in ranking visual clusters and ranking images rather than in developing the visual clusters themselves.

To capture the global color and texture content of an image, method 300 may extract grid color moment features from each image at 302. Grid color moment features may represent the spatial color distributions in each image. At 304, method 300 may extract Gabor texture features from each image. Texture may be an important feature of natural images and Gabor texture features may represent the texture of an image. At 306, method 300 may sequentially link together the grid color moment features from 302 and the Gabor textures from 304 to produce a single feature vector for the global color and texture content of each image in the dataset.

Each image may be represented by local interest point descriptors. Thus, at 308, method 300 may derive the local interest point descriptors for each image. While some images may have thousands of interest points, typical images the evaluated photo collections have a few hundred interest points. The local interest point descriptors may be given by the scale-invariant feature transform (SIFT), for example. Here, interest points and local descriptors associated with the interest points may be determined through a difference of Gaussian process.

At 310, method 300 may utilized the K-means clustering algorithm to create a set of visual clusters $V \in V_x$ for each landmark x. For the K-means clustering algorithm, K points may be placed as initial group centroids into the space represented by the objects that are being clustered. Each object then may be assigned to the group that has the closest centroid. The positions of the K centroids may be recalculated. Each object then may be reassigned and then the K centroids may be recalculated until the centroids no longer move beyond a predetermined distance.

For 310, the objects that are being visually clustered may be the feature vector for the global color and texture content of each image. In one example, the initial number of seed points K may be based on Bayesian Information Criterion (BIC). Preferably, the initial number of seed points K may be selected so that the average number of photos in each resulting visual cluster may be around twenty. A reason for utilizing twenty is that the number of photos to be visually clustered for each location x may vary from a few dozen to a few hundred.

Ranking Visual Clusters (108)

Figure 4:
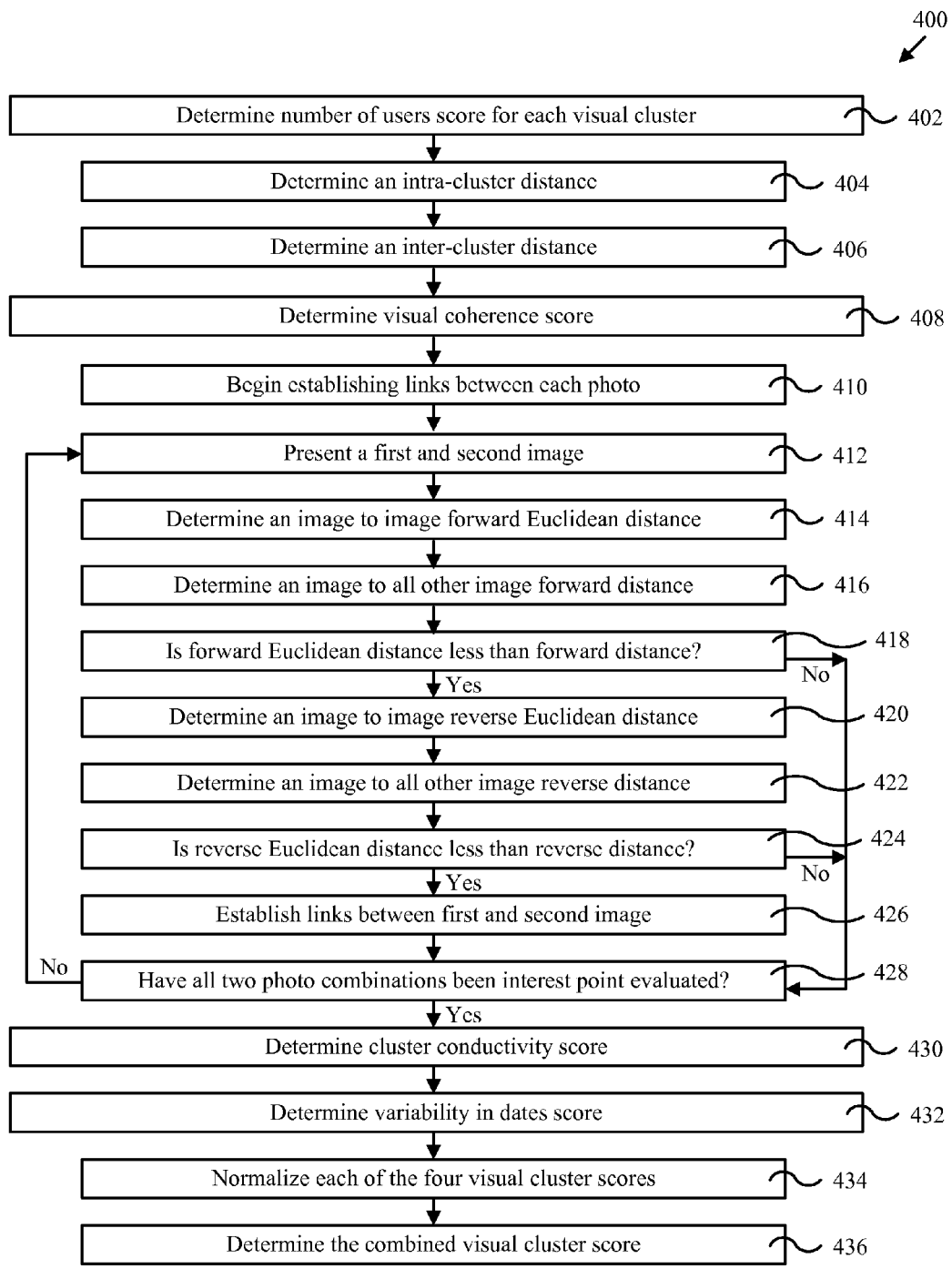
FIG. 4 is a flow chart illustrating a method 400 to rank each visual cluster V from the set of visual clusters $V_x$.

FIG. 4 is a flow chart illustrating a method 400 to rank each visual cluster V from the set of visual clusters $V_x$. Ranking each visual cluster V permits system 100 to sample the top-ranked images from the most representative visual clusters and return those views to the user as part of a generated set of representative images, $R_x$. Since lower-ranked visual clusters are more likely to contain less-representative photographs, visual clusters ranked below a predetermined threshold may be discarded and/or hidden from the user.

In general, four visual cluster scores may be derived from particular information of each cluster. The four cluster scores may reflect a broad interest in the photos from a particular visual cluster, a visual cohesiveness among the photos in a particular visual cluster, and an on-going interest in the cluster's visual subjects. Each of the four visual cluster scores then may be normalized over the set of visual clusters $V_x$ so that an average visual cluster score for each visual cluster V may be obtained. A higher score for visual cluster $V_1$ suggests that photos in visual cluster $V_1$ may be more representative of the landmark x than photos in a different visual cluster, such as a visual cluster $V_8$.

Visual clusters should contain photos from many different users as a way of demonstrating a broad interest in the photos from a particular visual cluster. Thus, at 402, method 400 may determine for each visual cluster the number different users that may be represented in the photo set of each visual cluster V, or $|U_v|$. Each derived number of different users may be utilized as a number of users score for each visual cluster. This may be achieved by comparing the photo uploader identifier $u_p$ for each photo in a visual cluster and counting the number of different photo uploader identifiers.

Visual clusters should be visually cohesive in that the photos within a visual cluster substantially should be of the same type of photograph or show the same objects. Here, the global color and texture content of each image may be utilized to determine visual coherence of a given visual cluster relative to all visual clusters. In addition, the local (SIFT) features of each image may be utilized to determine cluster connectivity within a given visual cluster.

At 404, method 400 may determine for each visual cluster an intra-cluster distance. The intra-cluster distance may be the average distance between photos within a visual cluster V. This may be determined by summing the value of the global color and texture content feature vector of each image in the visual cluster and dividing the results by the number of feature vectors in the visual cluster. At 406, method 400 may determine for each visual cluster an inter-cluster distance. The inter-cluster distance may be the average distance between photos within a visual cluster and photos outside of the visual cluster. At 408, method 400 may determine the ratio of inter-cluster distance to intra-cluster distance to produce a visual coherence score for each visual cluster. A high ratio (a high visual coherence score) may indicate that the visual cluster may be formed tightly and may convey a visually coherent view. A low ratio (a low visual coherence score) may indicate that the visual cluster may be noisy and may not convey a visually coherent view or may indicate that the visual cluster may be undesirably similar to other visual clusters.

As noted above, the local (SIFT) features of each image may be utilized to determine cluster connectivity within a given visual cluster. In general, local features within two photos may be link if they likely show the same feature. For example, if two photos show the top bolt on the East side of the eighteenth support wire of the Golden Gate Bridge, then a link may be drawn from the top bolt in the first photo to the top bolt in the second photo. If photos of a visual cluster are linked to many other photos in the same visual cluster, then these links may imply a similar view or object that appears in many photos such that the given visual cluster likely may be representative. Thus, at 410, method 400 may begin establishing links between each photo in a visual cluster V for each visual cluster $V_x$. Establishing a link between any two images may be achieved as follows.

At 412, method 400 may present a first image and a second image, each having a set of SIFT interest points and associated descriptors and each located within the same visual cluster. Typically, images may have a few hundred interest points, while some images may have thousands. At 414, method 400 may determine a forward Euclidean distance between a given SIFT descriptor in the first image and a given SIFT descriptor in the second image. Method 400 may utilize a forward and reverse matching process and the terms forward and reverse may be utilized to distinguish these processes.

At 416, method 400 may determine the forward distance between the given SIFT descriptor in the first image and all other points in the second image. At 418, method 400 may determine whether the forward Euclidean distance plus a predetermined threshold is less than the forward distance between the given SIFT descriptor in the first image and all other points in the second image. If the forward Euclidean distance plus a predetermined threshold is not less than the forward distance between the given SIFT descriptor in the first image and all other points in the second image, then method 400 may proceed to 428.

If the forward Euclidean distance plus a predetermined threshold is less than the forward distance between the given SIFT descriptor in the first image and all other points in the second image, then method 400 may proceed to 420. Step 420 may involve a reverse matching process. That is, instead of matching from the first image to the second image as in steps 414 to 418, method 400 may match from the second image to the first image.

At 420, method 400 may determine the reverse Euclidean distance between the given SIFT descriptor in the second image and the given SIFT descriptor in the first image. At 422, method 400 may determine the reverse distance between the given SIFT descriptor in the second image and all other points in the first image. At 424, method 400 may determine whether the reverse Euclidean distance plus a predetermined threshold is less than the reverse distance between the given SIFT descriptor in the second image and all other points in the first image. If the reverse Euclidean distance plus a predetermined threshold is less than the reverse distance between the given SIFT descriptor in the second image and all other points in the first image, then method 400 may proceed to 426. At 426, method 400 may establish a link between the given SIFT descriptor in the first image and the given SIFT descriptor in the second image.

If the reverse Euclidean distance plus a predetermined threshold is not less than the reverse distance between the given SIFT descriptor in the second image and all other points in the first image, then method 400 may proceed to 428. At 428, method 500 may determine for each visual cluster $V_x$ whether each combination of two photos in a given visual cluster V have been evaluated for point-wise correspondences between interest points. If each combination of two photos a given visual cluster V have not been evaluated for point-wise correspondences between interest points, then method 500 may return to 412. If each combination of two photos a given visual cluster V have been evaluated for point-wise correspondences between interest points, then method 500 may proceed to 430.

After all possible links have been established between each photo in a visual cluster V for each visual cluster $V_x$, method 400 may determine at 430 the average number of links per photo in each visual cluster $V_x$. Each average derived for a visual cluster may be deemed a cluster conductivity score for that visual cluster.

Visual clusters should contain photos that may be distributed relatively uniformly in time as a way of determining an on-going interest in the imaged subjects of the visual cluster. Thus, at 432, method 400 may determine for each visual cluster the standard deviation of the dates in which the photos in a visual cluster were taken. The standard deviation for each visual cluster may be deemed the variability in dates score for that visual cluster.

Standard deviation may include a measure of the spread/dispersion of a set of data. The dates in which the photos in a visual cluster were taken may be determined by the photo capture time $t_p$ of each photo. Preference may be given to visual clusters with higher variability in dates, since this may indicated that the view within that visual cluster might be of persistent interest. Low variability in dates may indicate that the photos in the visual cluster may have been taken around the same time and that the visual cluster may be related to an event rather than a landmark.

At this point in method 400, each visual cluster may be represented by four visual cluster scores: a number of users score, a visual coherence score, a cluster connectivity score, and a variability in dates score. At 434, method 400 may normalize each of the four visual cluster scores across the visual clusters. In one example, the L1-norm of each of the scores over all visual clusters may be equal to one. At 436, method 400 may average the four normalized visual cluster scores for each visual cluster. The average for each visual cluster may be deemed a combined visual cluster score for that visual cluster. A higher combined visual cluster score for a visual cluster may suggest that the photos in that visual cluster may be more representative of the landmark.

Ranking Images in Each Visual Cluster (110)

Figure 5:
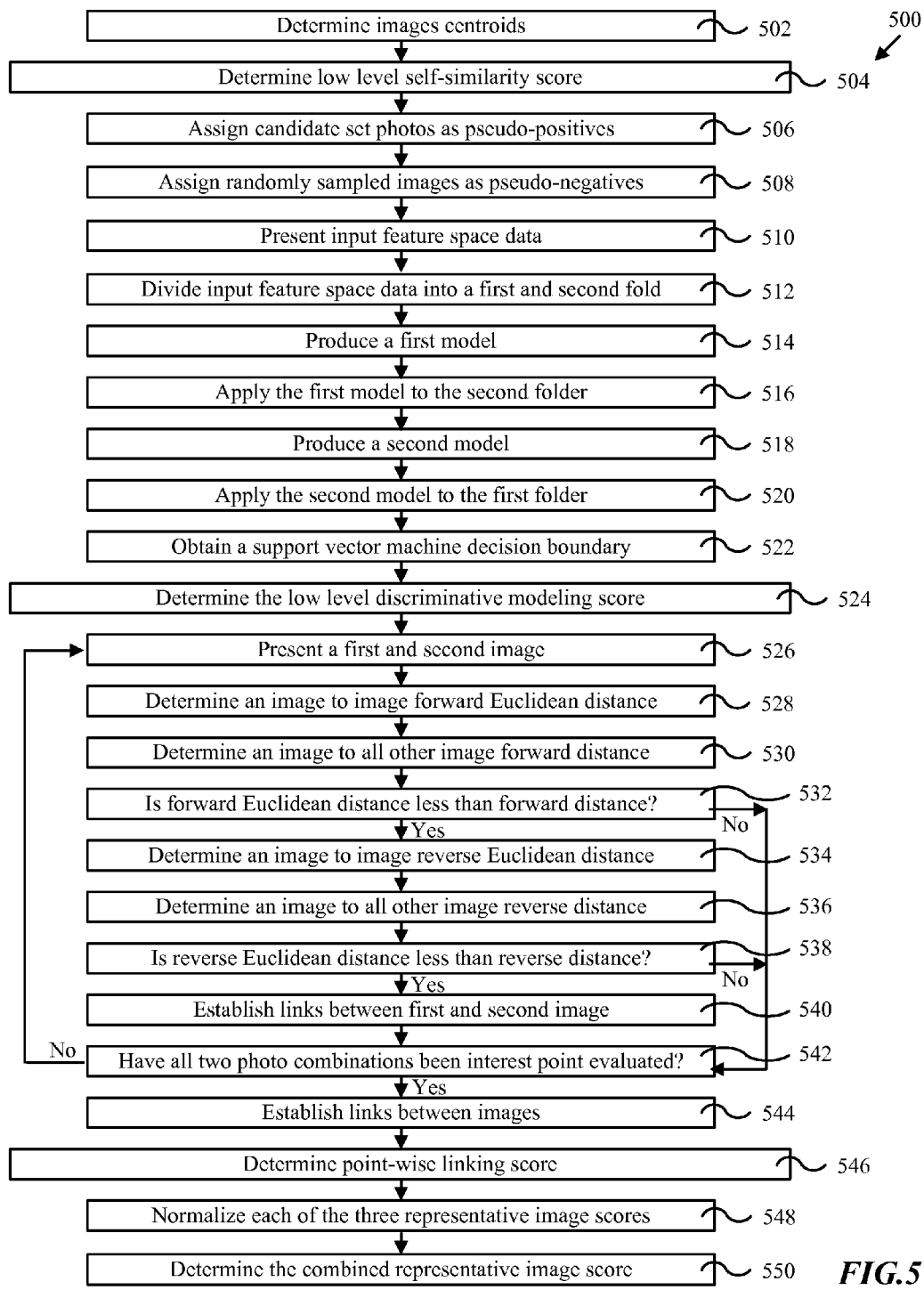
FIG. 5 is a flow chart illustrating a method 500 to rank each image within a visual cluster V for each visual cluster.

FIG. 5 is a flow chart illustrating a method 500 to rank each image within a visual cluster V for each visual cluster. This ranking may provide a way to determine how well a particular image within a visual cluster represents that visual cluster. For method 500, three representative image scores may be derived through comparing the images within the same visual cluster among themselves. Each of the three representative image scores may be normalized and an average score may be derived. A higher average score for an image suggests that the image may more likely represent its visual cluster than images in that same visual cluster having lower average scores.

In general, representative images of a visual cluster may exhibit a mixture of qualities: (1) representative images may be highly similar to other images in its visual cluster, (2) representative images may be highly dissimilar to random images outside its visual cluster, and (3) representative images may feature commonly-photographed local structures from within the set. Thus, for each image, method 500 may generate a low level self-similarity score, a low-level discriminative modeling score, and a point-wise linking score.

At 502, method 500 may determine the centroid of all the images within a visual cluster for each visual cluster. This may be the centroid of all of the images in low-level global (color and texture) feature space. The feature vector for the global color and texture content of each image of method 300 may be utilized to determine the centroid. First, each feature dimension may be statistically normalized to have a mean of zero and unit standard deviation. The centroid then may be determined by calculating the mean of each feature dimension. At 504, method 500 may rank each image by the Euclidean distance that the image resides from the centroid. The rank of each image may be the low level self-similarity score for that image. This low level self-similarity score may be utilized to measure whether images are similar to other images in a visual cluster Method 500 next may measure the dissimilarity between a given image within a visual cluster and images outside of that visual cluster. The value of this measurement for an image may be the low-level discriminative modeling score for that image. For this, method 500 may utilize a discriminative learning approach by taking the images within a visual cluster to be pseudo-positives and the images outside that visual cluster to be pseudo-negatives. Intuitively, centroids may be affected adversely by the existence of outliers or bi-modal distributions. Similarly, the distances between examples in one dimension may be less meaningful (or discriminative) than the distances in another dimension. Learning a discriminative model against pseudo-negatives may help to alleviate these effects, may help to better localize the prevailing distribution of positive examples in feature space, and may help to eliminate non-discriminative dimensions.

At 506, method 500 may deem the photos Pv from within a candidate set as pseudo-positives for learning. At 508, method 500 may sample images randomly from the global pool, P, and treat these images as pseudo-negatives. At 510, method 500 may present input feature space data. The input feature space data may be the same normalized low-level global feature vector (consisting of color and texture) from the distance-ranking model of 504. At 512, method 500 may randomly partition the input feature space data into a first fold and a second fold.

At 514, method 500 may train a first support vector machine (SVM) classifier with the contents of the first fold to produce a first model. At 516, method 500 may apply the first model to the contents of the second fold. At 518, method 500 may train a second support vector machine classifier with the contents of the second fold to produce a second model. At 520, method 500 may apply the second model to the contents of the first fold. Switching the training and testing folds may produce a support vector machine decision boundary at 522. At 524, method 500 may rank each image according to the image distance from the support vector machine decision boundary. The rank value for each image may be deemed a low-level discriminative modeling score for each image.

Method 500 next may determine whether any two images may be of the same real-world scene, or contain the same objects. Here, the local SIFT descriptors may be utilized to discover the presence of overlaps in real-world structures or scenes between two photographs. The overlap between any two given images may be discovered through the identification of correspondences between interest points in these images, similar to steps 410-428 of method 400. In this case, ambiguity rejection may be applied to discover correspondences between interest points for two images, each with a set of SIFT interest points and associated descriptors.

At 526, method 500 may present a first image and a second image, each having a set of SIFT interest points and associated descriptors. At 528, method 500 may determine the forward Euclidean distance between a given SIFT descriptor in the first image and a given SIFT descriptor in the second image. At 530, method 500 may determine the forward distance between the given SIFT descriptor in the first image and all other points in the second image. At 532, method 500 may determine whether the forward Euclidean distance plus a predetermined threshold is less than the forward distance between the given SIFT descriptor in the first image and all other points in the second image.

If the forward Euclidean distance plus a predetermined threshold is not less than the forward distance between the given SIFT descriptor in the first image and all other points in the second image, then method 500 may proceed to 542. If the forward Euclidean distance plus a predetermined threshold is less than the forward distance between the given SIFT descriptor in the first image and all other points in the second image, then method 500 may proceed to 534. Step 534 may involve a reverse matching process. That is, instead of matching from the first image to the second image as in steps 514 to 532, method 500 may match from the second image to the first image.

At 534, method 500 may determine the reverse Euclidean distance between the given SIFT descriptor in the second image and the given SIFT descriptor in the first image. At 536, method 500 may determine the reverse distance between the given SIFT descriptor in the second image and all other points in the first image. At 538, method 500 may determine whether the reverse Euclidean distance plus a predetermined threshold is less than the reverse distance between the given SIFT descriptor in the second image and all other points in the first image.

If the reverse Euclidean distance plus a predetermined threshold is less than the reverse distance between the given SIFT descriptor in the second image and all other points in the first image, then method 500 may proceed to 540. At 540, method 500 may establish a link between the given SIFT descriptor in the first image and the given SIFT descriptor in the second image. If the reverse Euclidean distance plus a predetermined threshold is not less than the reverse distance between the given SIFT descriptor in the second image and all other points in the first image, then method 500 may proceed to 542. At 542, method 500 may determine whether each combination of two photo have been evaluated for point-wise correspondences between interest points. If each combination of two photos have not been evaluated for point-wise correspondences between interest points, then method 500 may return to 526. If each combination of two photos have been evaluated for point-wise correspondences between interest points, then method 500 may proceed to 544.

Once the correspondences have been determined between points in various images in the set, method 500 may establish at 544 links between images as coming from the same real-world scene where the number of point-wise correspondences between the two images exceeds a threshold. Experiments have shown that a threshold equal to three may yield precise detection. Thus, in one example, method 500 may establish links between images as coming from the same real-world scene where the number of point-wise correspondences between the two images exceeds three. The result of establishing links between images may be a graph of connections between images in the candidate set based on the existence of corresponding points between the images.

Representative views of a landmark may contain many important points of the structure, and these may be linked across various images. On the other hand, nonrepresentative views, such as extreme close-ups or shots primarily of people, may have fewer links across images. Thus, at 546, method 500 may rank each image based on the total number of images to which they are connected. This ranking may be based on the total number of images to which they are connected and the ranking for each image may be deemed the point-wise linking score for that image.

At this point in method 500, each image may be identified by three representative image scores: a low level self-similarity score, a low-level discriminative modeling score, and a point-wise linking score. At 548, method 500 may normalize the three representative image scores across all images. In one example, the three representative image scores may be normalized through logistic normalization. At 550, method 500 may average the three normalized representative image scores for each image to obtain a combined representative image score for each image. A higher combined representative image score for an image may mean that the particular image may be very representative of its visual cluster.

Generating a Ranked List of Representative Photos $R_x$ (112)

Figure 6:
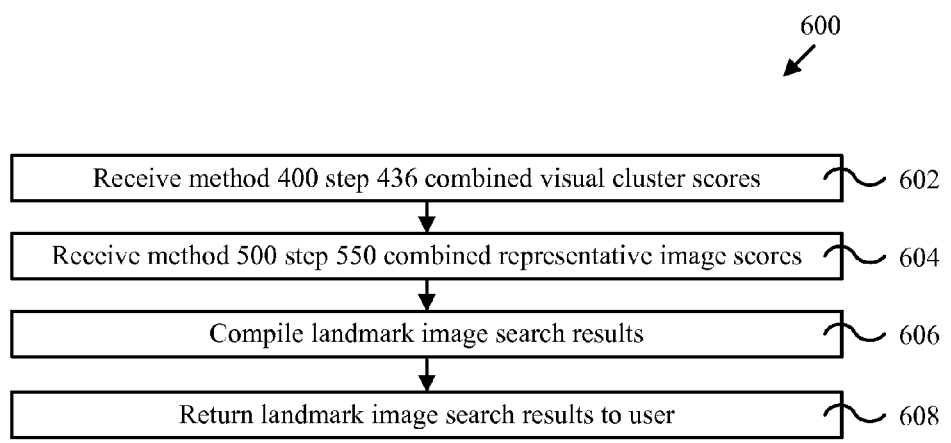
FIG. 6 is a flow chart illustrating a method 600 to generate a final ranked list of representative images $R_x$.

FIG. 6 is a flow chart illustrating a method 600 to generate a final ranked list of representative images $R_x$. Recall that the lower-ranked visual clusters may have been discarded through method 400. This may have reduced the number of potential representative photos.

In general, the highest ranking images in the highest ranking visual cluster $R_V$ may be sampled first. This sampling may be proportionally to the score of the highest ranking visual cluster. Then, the highest ranking images in the second highest ranking visual cluster $R_V$ may be sampled proportionally to the score of the second highest ranking visual cluster.

At 602, method 600 may receive the combined visual cluster scores from step 436 of method 400. At 604, method 600 may receive the combined representative image scores from step 550 of method 500. At 606, method 600 may compile a landmark image search result as a function of the rank of each visual cluster and the rank of each image. The rank of each visual cluster may be based on the visual cluster scores from step 436. The rank of each image may be based on the representative image scores from step 550.

At 606, the highest ranking images from each visual cluster may be sampled in order of the rank of the visual cluster and sampled proportionally to the score of that visual cluster until a predetermined number of images populate the landmark image search result (populate the final ranked list of representative images $R_x$). The resulting ranked list of images may capture varying representative views for each landmark. The images from the resulting ranked list may be returned to the user at 608.

Network Environment for a Landmark Image Search System

Figure 7:
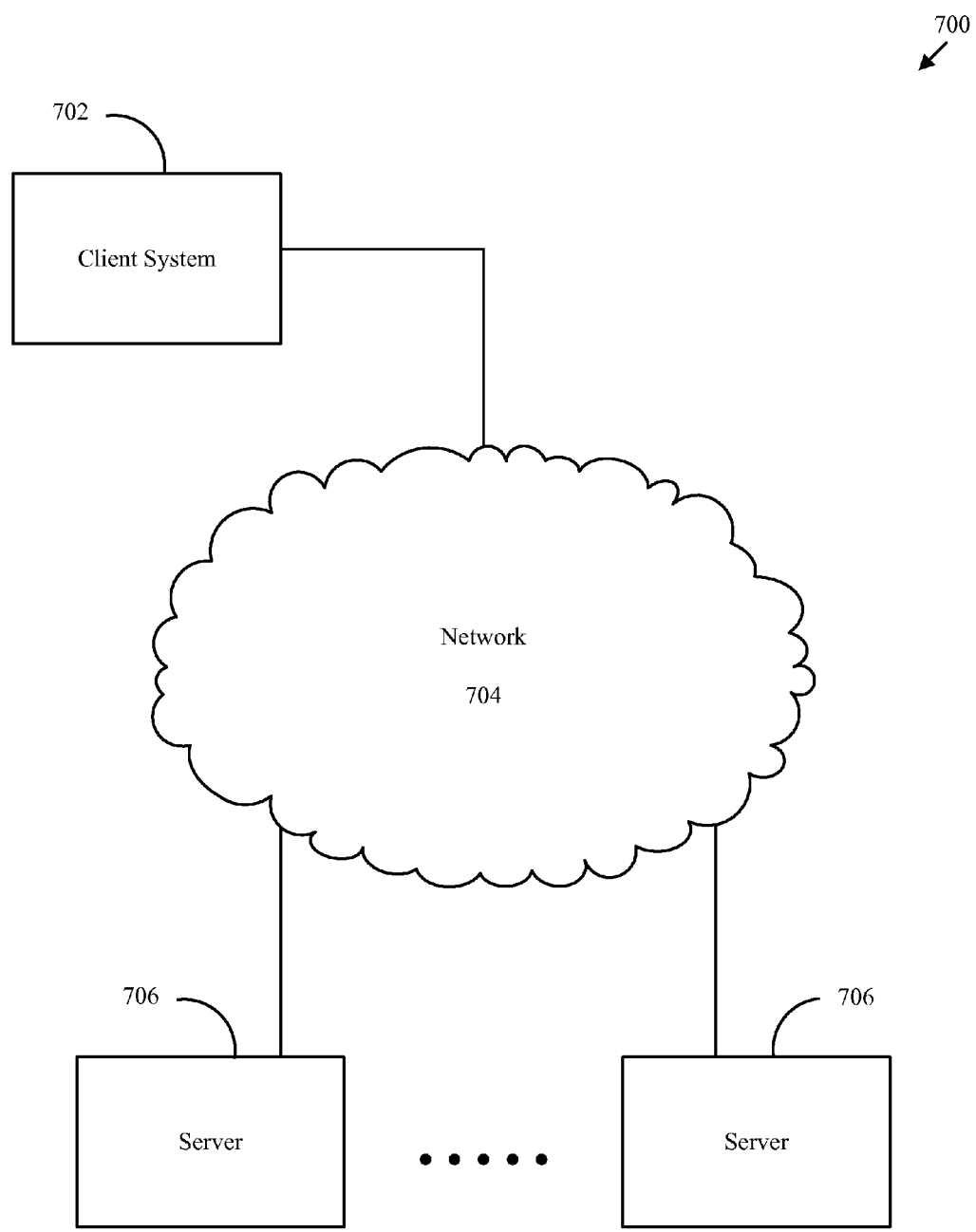
FIG. 7 illustrates a network environment 700 for operation of the landmark image search system 100.

FIG. 7 illustrates a network environment 700 for operation of the landmark image search system 100. The network environment 700 may include a client system 702 coupled to a network 704 (such as the Internet, an intranet, an extranet, a virtual private network, a non-TCP/IP based network, any LAN or WAN, or the like) and server systems $706_1$ to $706_N$. A server system may include a single server computer or a number of server computers. Client system 702 may be configured to communicate with any of server systems $706_1$ to $706_N$, for example, to request and receive base content and additional content (e.g., in the form of photographs).

Client system 702 may include a desktop personal computer, workstation, laptop, PDA, cell phone, any wireless application protocol (WAP) enabled device, or any other device capable of communicating directly or indirectly to a network. Client system 702 typically may run a web browsing program that may allow a user of client system 702 to request and receive content from server systems $706_1$ to $706_N$ over network 704. Client system 702 may one or more user interface devices (such as a keyboard, a mouse, a roller ball, a touch screen, a pen or the like) to interact with a graphical user interface (GUI) of the web browser on a display (e.g., monitor screen, LCD display, etc.).

In some embodiments, client system 702 and/or system servers $706_1$ to $706_N$ may be configured to perform the methods described herein. The methods of some embodiments may be implemented in software or hardware configured to optimize the selection of additional content to be displayed to a user.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

The invention claimed is:

1. A method to compile a landmark image search result, the method comprising:

receiving, using a computer, a plurality of images and data for each of the images, the data comprising a location corresponding to each image;

grouping the images into a plurality of location clusters based on the location corresponding to each image, each location cluster comprising at least one image;

grouping images of each location cluster into a plurality of visual clusters based on visual features of each image;

determining a rank of each image within each visual cluster according to at least one of a low-level self-similarity score, a low-level discriminative modeling score, and a point wise linking score; and compiling the landmark image search result as a function of the rank of each image.

2. The method of claim 1, further comprising:

determining a rank of each visual cluster of a set of visual cluster utilizing at least one of a number of users score, a visual coherence score, a cluster connectivity score, and a variability in dates score, where determining a rank of each image includes determining a rank of each image within a visual cluster for each visual cluster, and where compiling the landmark image search result includes compiling the landmark image search result as a function of both the rank of each visual cluster and the rank of each image.

3. The method of claim 2, where the visual coherence score is based on the ratio of an inter-cluster distance to an intra-cluster distance.

4. The method of claim 2, where the cluster connectivity score is obtained in part by determining a forward Euclidean distance between a descriptor in a first image and a descriptor in a second image and determining a reverse Euclidean distance between a descriptor in the second image and a descriptor in the first image.

5. The method of claim 2, where the cluster connectivity score is obtained in part by determining whether a forward Euclidean distance plus a predetermined threshold is less than a forward distance between a descriptor in a first image and all other points in a second image.

6. The method of claim 2, where the cluster connectivity score is obtained in part by determining an average number of links per photo for all the photos in a visual cluster.

7. The method of claim 1, where the low-level self-similarity score is obtained in part by determining the Euclidean distance that an image resides from a centroid, where the centroid is based on local geometric descriptors.

8. The method of claim 1, where the low-level discriminative modeling score is obtained in part by assigning a set of candidate photos as pseudo-positives and assigning randomly sampled images as pseudo-negatives.

9. The method of claim 1, where the low-level discriminative modeling score is obtained in part by producing a support vector machine decision boundary, where the support vector machine decision boundary is produced by applying a first model from a first support vector machine to the contents of a second fold and applying a second model from a second support vector machine to the contents of a first fold.

10. A system, comprising at least one processor and memory., to compile landmark image search results, the system comprising:

a module for receiving a plurality of images and data for each of the images, the data comprising a location corresponding to each image;

a module for grouping the images into a plurality of location clusters based on the location corresponding to each image, each location cluster comprising at least one image;

a module for grouping images of each location cluster into a plurality of visual clusters based on visual features of each image;

a module for ranking images in each visual cluster to determine a rank of each image within the visual cluster according to at least one of a low-level self-similarity score, a low-level discriminative modeling score, and a point wise linking score; and a ranked list generator module to compile the landmark image search result as a function of the rank of each image.

11. The system of claim 10, further comprising:

a module for ranking visual clusters to determine a rank of each visual cluster utilizing at least one of a number of users score, a visual coherence score, a cluster connectivity score, and a variability in dates score, where the ranking images in a visual cluster includes determining a rank of each image within a visual cluster for each visual cluster, and where the ranked list generator to compile the landmark image search result further is to compile the landmark image search result as a function of both the rank of each visual cluster and the rank of each image.

12. The system of claim 11, where the visual coherence score is based on the ratio of an inter-cluster distance to an intra-cluster distance.

13. The system of claim 11, where the cluster connectivity score is obtained in part by determining a forward Euclidean distance between a descriptor in a first image and a descriptor in a second image and determining a reverse Euclidean distance between a descriptor in the second image and a descriptor in the first image.

14. The system of claim 11, where the cluster connectivity score is obtained in part by determining whether a forward Euclidean distance plus a predetermined threshold is less than a forward distance between a descriptor in a first image and all other points in a second image.

15. The system of claim 11, where the cluster connectivity score is obtained in part by determining an average number of links per photo for all the photos in a visual cluster.

16. The system of claim 10, where the low-level self-similarity score is obtained in part by determining the Euclidean distance that an image resides from a centroid, where the centroid is based on local geometric descriptors.

17. The system of claim 10, where the low-level discriminative modeling score is obtained in part by assigning a set of candidate photos as pseudo-positives and assigning randomly sampled images as pseudo-negatives.

18. The system of claim 10, where the low-level discriminative modeling score is obtained in part by producing a support vector machine decision boundary, where the support vector machine decision boundary is produced by applying a first model from a first support vector machine to the contents of a second fold and applying a second model from a second support vector machine to the contents of a first fold.

19. A non-transitory computer readable medium comprising a set of instructions which, when executed by a computer, cause the computer to compile landmark image search results, the instructions for:

receiving a plurality of images and data for each of the images, the data comprising a location corresponding to each image;

grouping the images into a plurality of location clusters based on the location corresponding to each image, each location cluster comprising at least one image;

grouping images of each location cluster into a plurality of visual clusters based on visual features of each image;

determining a rank of each image within each visual cluster according to at least one of a low-level self-similarity score, a low-level discriminative modeling score, and a point wise linking score; and compiling the landmark image search result as a function of the rank of each image.

20. The computer readable medium of claim 19, further comprising instructions for:

determining a rank of each visual cluster of a set of visual cluster utilizing at least one of a number of users score, a visual coherence score, a cluster connectivity score, and a variability in dates score, where determining a rank of each image includes determining a rank of each image within a visual cluster for each visual cluster, and where compiling the landmark image search result includes compiling the landmark image search result as a function of both the rank of each visual cluster and the rank of each image.

21. The computer readable medium of claim 20, where the cluster connectivity score is obtained in part by determining a forward Euclidean distance between a descriptor in a first image and a descriptor in a second image and determining a reverse Euclidean distance between a descriptor in the second image and a descriptor in the first image.

22. The computer readable medium of claim 20, where the cluster connectivity score is obtained in part by determining whether a forward Euclidean distance plus a predetermined threshold is less than a forward distance between a descriptor in a first image and all other points in a second image.

23. The computer readable medium of claim 19, where the low-level discriminative modeling score is obtained in part by assigning a set of candidate photos as pseudo-positives and assigning randomly sampled images as pseudo-negatives.

24. The computer readable medium of claim 19, where the low-level discriminative modeling score is obtained in part by producing a support vector machine decision boundary, where the support vector machine decision boundary is produced by applying a first model from a first support vector machine to the contents of a second fold and applying a second model from a second support vector machine to the contents of a first fold.

* * * * *